(12) United States Patent
Pfitz (10) Patent No.: US 6,644,284 B2
(45) Date of Patent: Nov. 11, 2003

(54) METHOD FOR CONTROLLING THE METERING OF FUEL IN AN INJECTION SYSTEM AND CONTROL ARRANGEMENT THEREFOR

(75) Inventor: Manfred Pfitz, Vaihingen (DE)

(73) Assignee: Robert Bosch Gmbh, Stuttgart (DE)

( * ) Notice: Subject to any disclaimer, the term of this patent is extended or adjusted under 35 U.S.C. 154(b) by 12 days.

(21) Appl. No.: 10/029,264

(22) Filed: Dec. 28, 2001

(65) Prior Publication Data

US 2002/0088438 A1 Jul. 11, 2002

(30) Foreign Application Priority Data

Dec. 28, 2000 (DE) .......................................... 100 65 474

(51) Int. Cl.$^7$ ............................................... F02M 51/00
(52) U.S. Cl. ....................................................... 123/479
(58) Field of Search ................................. 123/479, 681, 123/684, 683, 688; 73/117.3, 118.2

(56) References Cited

U.S. PATENT DOCUMENTS

| 4,911,128 | A | * | 3/1990 | Hara et al. .................. 123/488 |
| 5,775,106 | A | * | 7/1998 | Denz et al. ................. 60/605.1 |
| 6,032,644 | A | * | 3/2000 | Bederna et al. ........ 123/339.15 |
| 6,370,935 | B1 | * | 4/2002 | He et al. ..................... 73/1.34 |
| 6,427,527 | B1 | * | 8/2002 | Langer ...................... 73/118.1 |

\* cited by examiner

*Primary Examiner*—Henry C. Yuen
*Assistant Examiner*—Hyder Ali
(74) *Attorney, Agent, or Firm*—Walter Ottesen (57) ABSTRACT

The invention relates to a method and a control arrangement for the metering of fuel in an injection system, especially for engines having an exhaust-gas turbocharger. The inducted air mass in the intake manifold (2) is measured as a primary control quantity by an air mass measuring apparatus (1) for the metering of fuel and the cylinder charge is computed via a control apparatus (3). A switchover to a substitute signal (P) as the primary control quantity takes place when a leak (8) is detected in the intake manifold (2) via a change of stored and actual pressure conditions.

7 Claims, 6 Drawing Sheets

METHOD FOR CONTROLLING THE METERING OF FUEL IN AN INJECTION SYSTEM AND CONTROL ARRANGEMENT THEREFOR

FIELD OF THE INVENTION

The invention relates to a method and an arrangement for controlling the metering of fuel of internal combustion engines equipped with an exhaust-gas turbocharger wherein the inducted air mass is determined via an air mass measuring apparatus and wherein this air mass is the primary control quantity for the computation of the cylinder charge.

BACKGROUND OF THE INVENTION

It is known to compute the fuel metering in turbo engines with an air mass measuring apparatus in the intake manifold. For this purpose, the air mass, which is inducted by the engine, is measured via an air mass measuring apparatus such as a hot wire air mass sensor (HLM) or a hot film air mass sensor (HFM). The air mass measured in this manner serves as a primary control quantity for the computation of the injection quantity in the injection system of the engine. A control apparatus of the injection system receives input signals from these sensors, namely, the air mass measuring apparatus, and computes the injection time as a measure for the fuel quantity to be injected from these input signals and additional stored data.

The technology of hot air mass sensors as air mass measuring apparatus has the disadvantage that a pressure drop in the intake manifold forward of the throttle flap cannot be detected. The air mass measuring apparatus (HFM or HLM) must be preset with imprecise triggering thresholds because of the following: the component tolerances of the hot air mass sensor, the component tolerances of the throttle flap potentiometer and of the throttle flap support as well as because of density changes in the inducted air because of different temperatures and ambient pressures. The occurrence of a leak in the intake manifold ahead of the throttle flap leads to the situation that the pressure drop is not detected by the air mass measuring apparatus and the fuel quantity is incorrectly computed and the engine can die because of the incorrect metering of fuel. In such a case, it is not wanted that the air mass measuring apparatus reacts to the pressure change because it is not the change of the air mass at the measuring apparatus which is the problem, but a leak ahead of the throttle flap. In the described method and control arrangements, a leak in the intake manifold therefore leads to an unwanted dying of the engine. A leak in the intake manifold of this kind can, for example, be caused by a bite of a marten or a loose hose clamp.

SUMMARY OF THE INVENTION

It is an object of the invention to provide a method and a control arrangement for the metering of fuel in turbo engines which make possible the detection of pressure drops in the intake manifold ahead of the throttle flap in each operating phase of the engine when a leak occurs. It is a further object of the invention to provide an effective emergency control of the metering of fuel when a leak occurs in the intake manifold.

The method of the invention is for controlling the metering of fuel of an injection system of an internal combustion engine having an intake manifold including an engine having an exhaust-gas turbocharger. The method includes the steps of: determining the inducted air mass (L) in the intake manifold of the engine as a primary control quantity utilizing an air mass measuring apparatus; computing a cylinder charge with a control apparatus; providing a substitute signal (P) as the primary control quantity; detecting a leak occurring in the intake manifold from a changed pressure ratio; and, switching over to the substitute signal (P) when the leak is detected.

With the method of the invention, a leak is detected in the intake manifold and, when such a fault is detected in the intake system, a switchover is made to a substitute signal as the primary control quantity for the metering of fuel. For this reason, a continued operation of the engine is ensured in every operating situation of the engine, that is, during charging operation as well as during induction operation of the exhaust-gas turbocharger. In this way, a stalling or dying of the engine because of an incorrectly measuring air mass measuring apparatus is avoided. With the occurrence of a fault in the intake system, a switchover takes place from the signal of the air mass measuring apparatus (HFM or HLM) to a computed substitute signal P. Occurring faults can be detected in all operating regions of the turbocharged engine. In the intake region of the engine, a leak between the compressor of the exhaust-gas turbocharger and the throttle flap can, for example, be detected. In the charge pressure region, that is, when the intake manifold pressure is greater than the ambient pressure, a pressure loss because of a leak can likewise be detected which, for example, is caused by a loose pipe clamp of the intake manifold. In both cases, an automatic switchover to a substitute signal takes place from the actual primary control signal of the air mass measuring apparatus and, in this way, an emergency operation is ensured notwithstanding the occurrence of the fault.

In accordance with an advantageous embodiment of the invention, the substitute signal is computed from the angular position of a throttle flap and the instantaneous engine rpm. The fuel metering thereby is based on an actual air mass, which is inducted by the engine, and not on the defective or incorrect air mass signals of the air mass measuring apparatus. The situation is avoided wherein the engine dies or stalls in idle or during load operation because of the fault. The fuel metering takes place without large deviations from the ideal value and, for this reason, larger lambda deviations and therefore deviations in the ideal mixture composition are avoided.

According to a further advantageous embodiment of the invention, a stored characteristic field with actual pressure conditions in the intake manifold is used to detect leaks in the intake manifold, that is, between the compressor of the exhaust-gas turbocharger and the throttle flap of the injection system. The pressure condition is, for example, the ratio of intake pipe pressure to charging pressure. In the case of a leak, the actual pressure ratio is greater than the value which is stored in the characteristic field for this pressure ratio. In this way, and in a simple manner, a leak in the intake manifold is detected because only an adaptation of the control apparatus and the storage of the characteristic field are required. The leak has the effect that, during idle operation of the engine as well as during load operation, the air mass flow measured by the air mass measuring apparatus is greater than the actual air mass flow inducted by the engine. From the comparison with the pressure ratios in the characteristic field, the control arrangement can detect a leak in the intake manifold.

According to an advantageous embodiment of the invention, a switchover to the substitute signal takes place only after the elapse of a preset delay time after the detection of a leak. In this way, the situation is avoided that already short-term deviations, which are not caused by a leak in the air intake system, are erroneously detected as a leak. With the method of the invention and the control arrangement, the situation is avoided that, in the case of a leak, an incorrect air mass is measured and, in this way, air masses which are too large or too small are processed in the control arrangement for computing the mixture formation in accordance with the particular operating state of the turbocharged engine. This would lead to the situation that a mixture is formed during fuel metering which is either too rich or too lean. Depending upon the size of the leak, such a deviation can no longer be controlled out by the lambda controller or by an adaptation of the mixture. Accordingly, with the invention, an uneven running of the engine or, in the worst case, a stalling or dying of the engine is avoided.

BRIEF DESCRIPTION OF THE DRAWINGS

The invention will now be described with reference to the drawings wherein.

DESCRIPTION OF THE PREFERRED EMBODIMENT OF THE INVENTION

Figure 1:
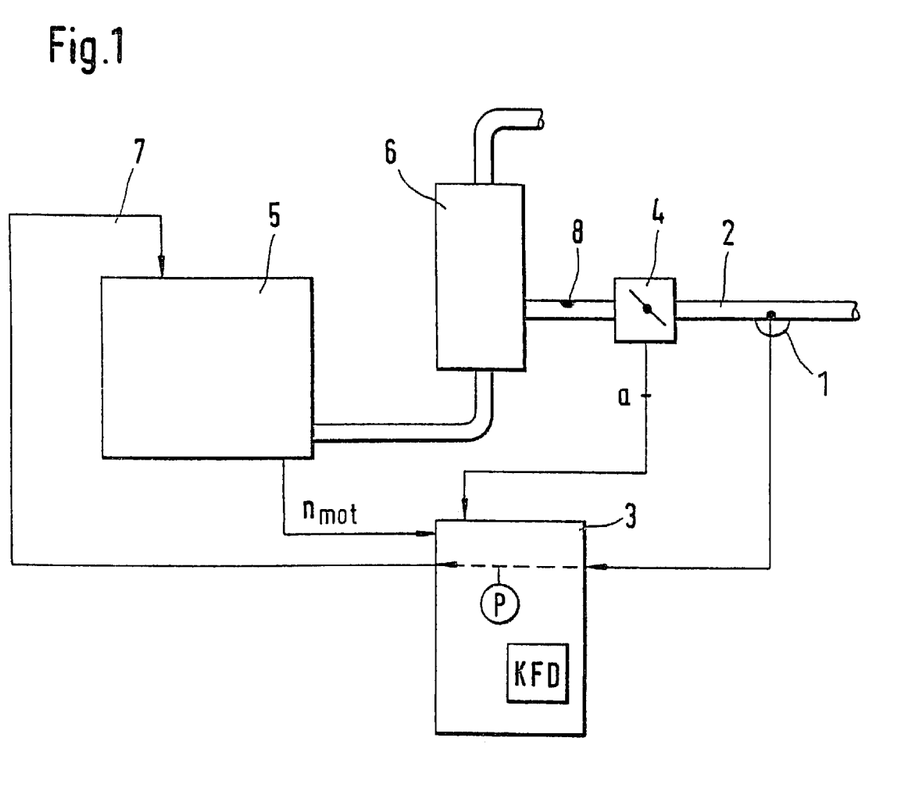
FIG. 1 is a schematic diagram of an embodiment of the control arrangement for metering fuel according to the invention.

FIG. 1 shows the configuration of a control arrangement according to the invention. An air mass measuring apparatus 1 is arranged on an intake manifold 2 and determines the air mass inducted by the engine 5. The air mass measuring apparatus 1 can, for example, be configured as a hot-film air mass sensor (HFM). It is understood that any other suitable air mass measuring apparatus 1 can be utilized. The air mass flow, which is measured by the air mass measuring apparatus 1, is supplied as a primary control quantity of the fuel metering for the engine 5 to a control unit 3 as an input signal. An exhaust-gas turbocharger 6 is disposed downstream in the intake manifold 2 rearward of the air mass measuring apparatus 1. During charging operation of the engine 5, the exhaust-gas turbocharger 6 supplies compressed air via the throttle flap 4 to the engine 5, that is, to the cylinders thereof.

During normal operation of the engine 5, the control apparatus 3 determines, on the basis of the input signal of the air mass measuring apparatus 1, the required quantity of fuel or, more specifically, over which time fuel must be introduced via the injection nozzle for an optimal air/fuel mixture. A fuel metering signal 7 is transmitted as an output signal by the control apparatus 3 to the engine 5. However, the air mass measured by the air mass measuring apparatus 1 is incorrect in the case of the occurrence of a leak 8 between the exhaust-gas turbocharger and the throttle flap 4. Depending upon the operating mode of the engine 5, either too little or too much air mass is determined by the air mass measuring apparatus compared to the actual air mass inducted by the engine. During a charging operation of the engine 5, air escapes via the leak 8 which was also measured by the air mass measuring apparatus 1. The air mass, which is measured by the air mass measuring apparatus 1, is therefore less than the actual air mass inducted by the engine. The opposite situation occurs in the induction operation of the engine 5 in that the air mass, which is measured by the air mass measuring apparatus 1, is less than the actual air mass inducted by the engine 5 because additional air can reach the engine 5 via the leak 8. To avoid this problem when a leak 8 occurs, the control arrangement according to the invention includes a stored characteristic field KFD of the pressure ratios in the intake manifold 2 via which the occurrence of a leak 8 in the intake manifold 2 can be detected. In the characteristic field KFD, the pressure ratios in the intake manifold 2 are stored for the injection system in the fault-free condition in dependence upon the operating mode of the engine (that is, from induction operation to charging operation). In this way, the control apparatus 3 can detect the occurrence of a leak 8 in the intake manifold 2. If a leak 8 has been detected by the control unit 3, then the control apparatus 3 switches from the measured air mass measuring signal of the air mass measuring apparatus 1 as a primary control quantity for the metering of fuel over to a computed substitute signal P as a substitute control quantity for the metering of fuel 7. The substitute signal P is computed by the control apparatus 3 from the angular position (a) of the throttle flap 4 and the instantaneous engine rpm $n_{mot}$. In this way, it is avoided that, for the occurrence of a leak 8 in the intake manifold 2, the engine 5 stalls or dies because of an incorrectly measured fuel mass by the air mass measuring apparatus 1 and therefore an incorrect metering of the fuel 7. The method according to the invention thereby makes an effective emergency operation of the engine 5 possible also when a leak 8 occurs.

Figure 2:
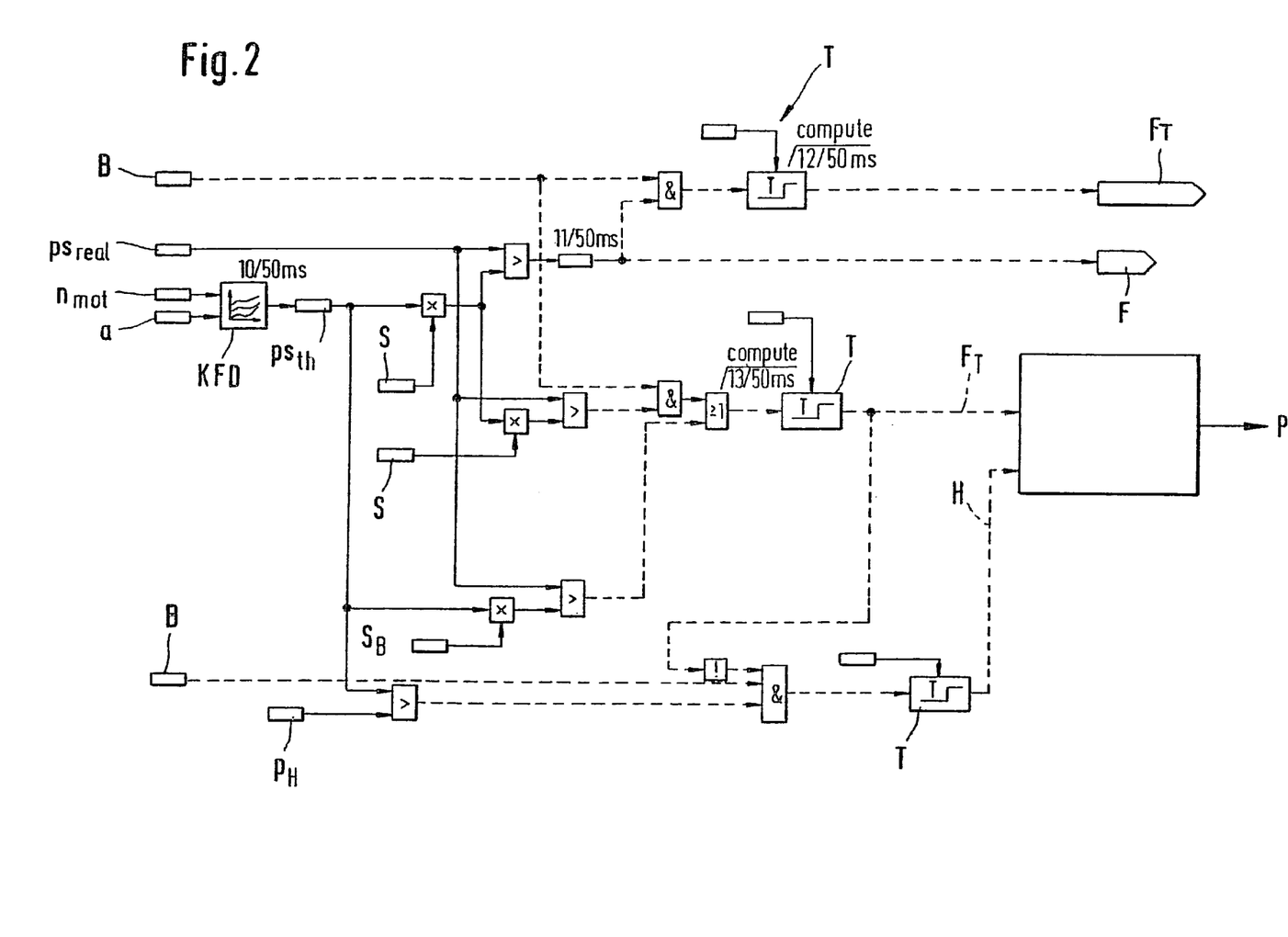
FIG. 2 is a function diagram of the control arrangement according to the invention.

FIG. 2 shows a function diagram of an embodiment of the control arrangement of the invention for manipulation B of the turbocharger controller. The actual engine rpm $n_{mot}$ and the throttle flap angle (a) are stored via a stored characteristic field KFD of the pressure ratios. A theoretical value for the pressure ratio $ps_{th}$ in the intake manifold is determined from the actual engine rpm $n_{mot}$ and the throttle flap angle (a). This theoretical pressure value $ps_{th}$ is compared to the actually measured pressure value $ps_{real}$. For a deviation between these two values, the control arrangement switches over to a substitute signal P after a pregiven time duration stored in the time member T in order to ensure an emergency operation; that is, a time-delayed fault signal $F_T$ is generated from the fault signal F. When the leak is repaired, the function in the control apparatus detects likewise that a leak is no longer present and generates the fault correction signal H and again switches to the primary control quantity of the measured air mass via the air mass measuring apparatus 1. In this way, in a simple manner, a leak 8 can be detected via a comparison of theoretical to real pressure conditions in the intake manifold 2 and, via a switchover to the substitute signal P, an effective emergency operation of the engine is ensured when a leak 8 is present.

Measurement reports are presented in FIGS. 3a to 3d, which show the effectiveness of the control provided by the invention. The engine rpm $n_{mot}$, the inducted, measured air mass flow L and the theoretical air mass flow $L_{th}$ are each plotted as a function of elapsed time. The theoretical air mass flow $L_{th}$ is computed from the angle position (a) of the throttle flap and the engine rpm $n_{mot}$.

Figure 3A:
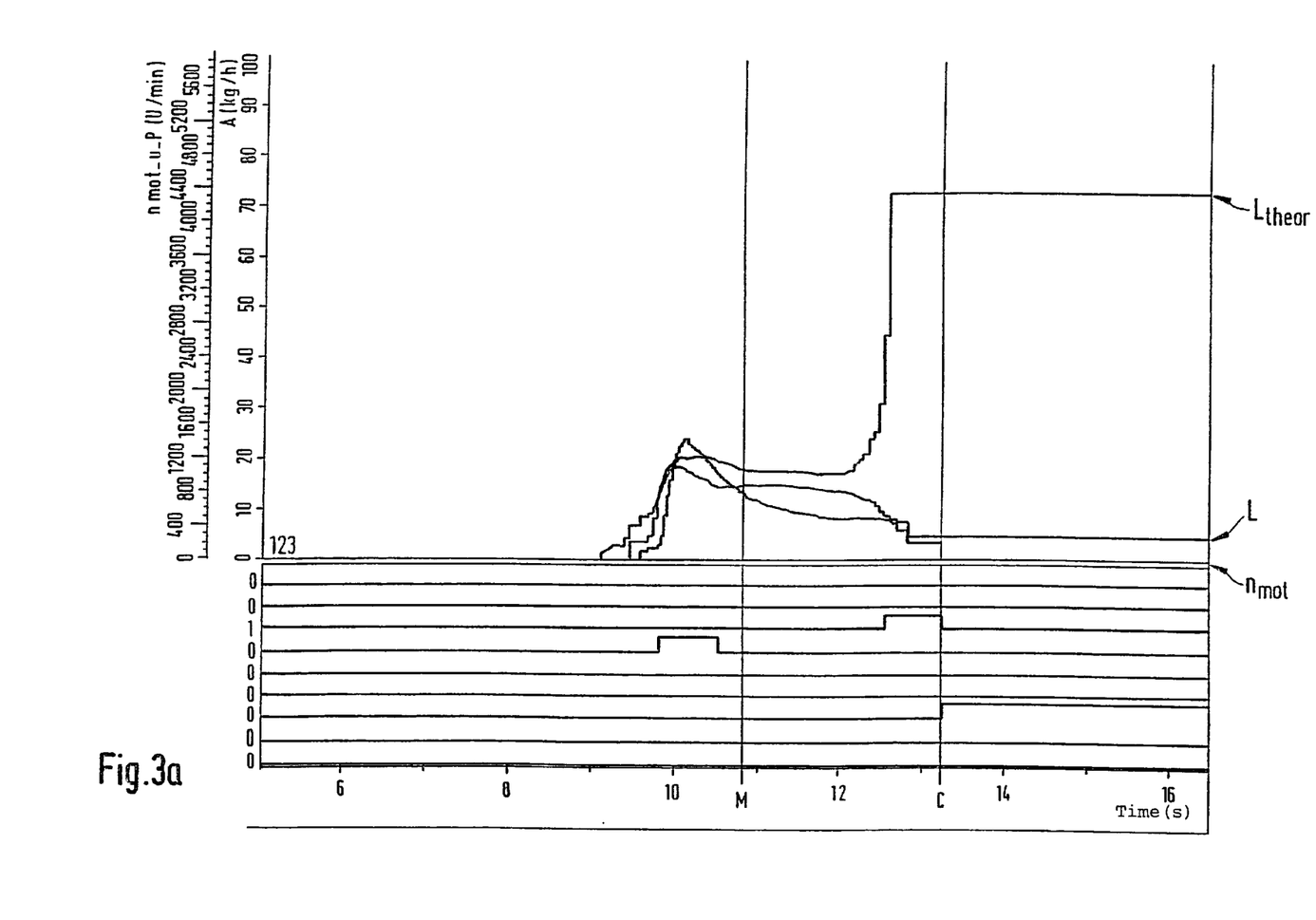
FIGS. 3a to 3d show measurement diagrams of various parameters plotted as a function of time for showing the effectiveness of the control provided by the invention.

FIG. 3a shows how, over the elapsed time, the turbocharged engine would die with the occurrence of a leak without the control arrangement according to the invention. Here, the intake manifold 2 has become separated between the compressor of the exhaust-gas turbocharger 6 and the throttle flap 4 in advance of the start of the engine. The engine runs up but dies after a certain time because of the incorrect metering of fuel. In this experiment, there was no switchover to the substitute signal P as a control quantity.

Figure 3B:
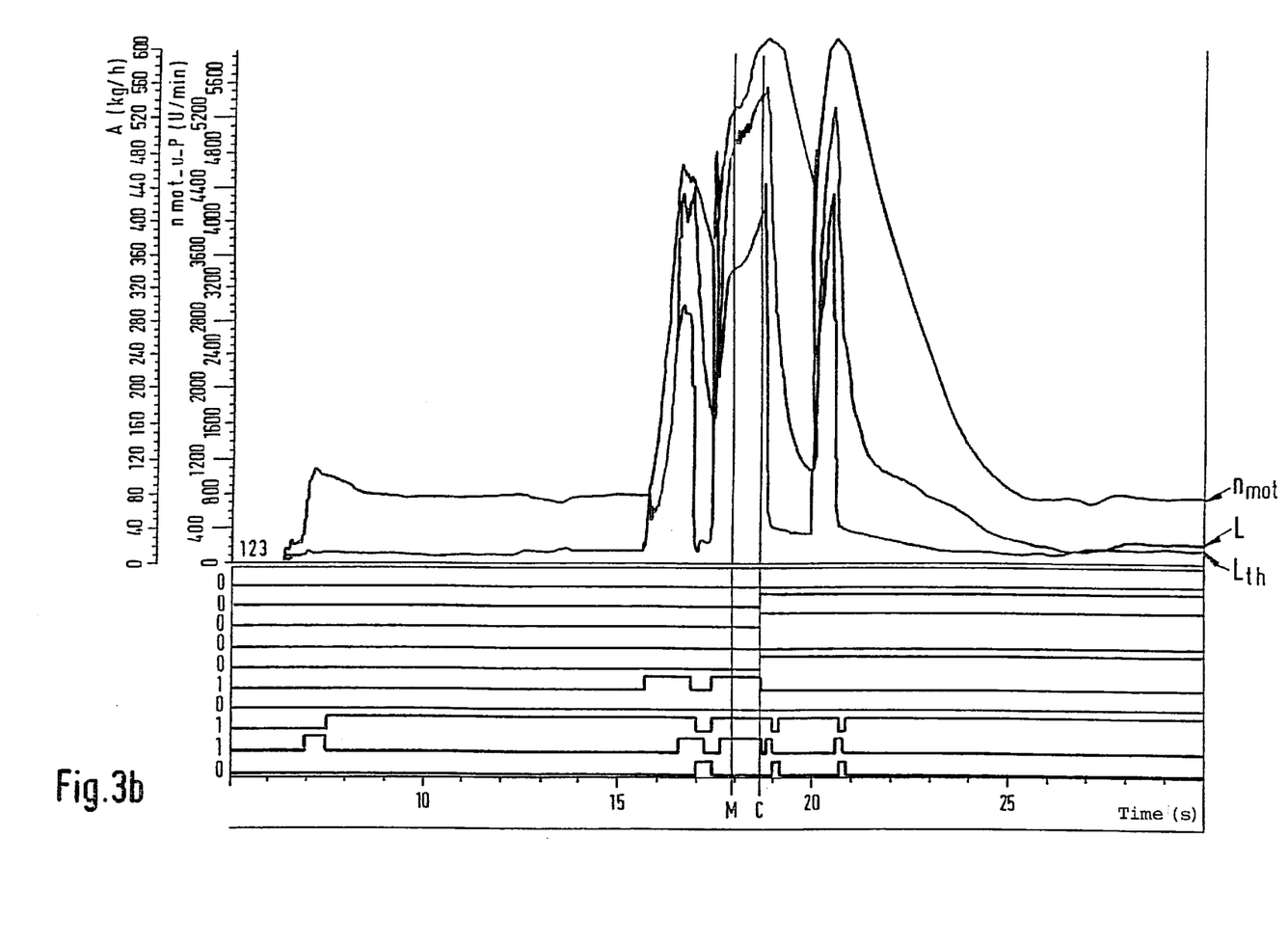

In FIG. 3b, the engine is started without a leak. However, after a certain time, a hose clamp of the intake manifold 2 becomes loose and causes a leak 8. The control method according to the invention permits a detection of the pressure drop in the intake manifold and a signal is correspondingly set for the presence of a leak.

Figure 3C:
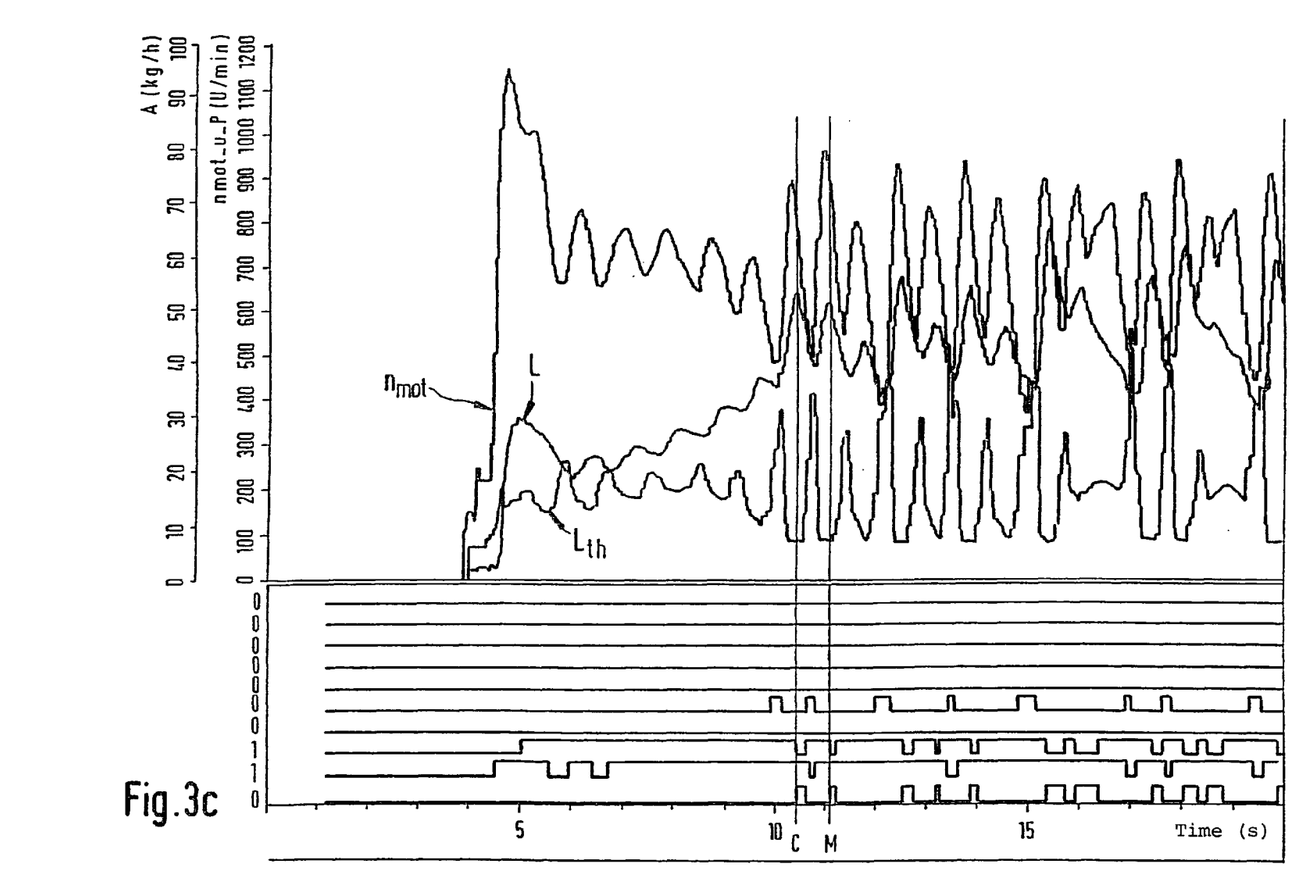

In FIG. 3c, an engine is started without a leak and thereafter the intake hose 2 is taken off so that a leak 8 occurs. Here, the signal of the occurrence of a leak is not set because the threshold, that is, the intensity of the deviation of the pressure conditions is too high.

Figure 3D:
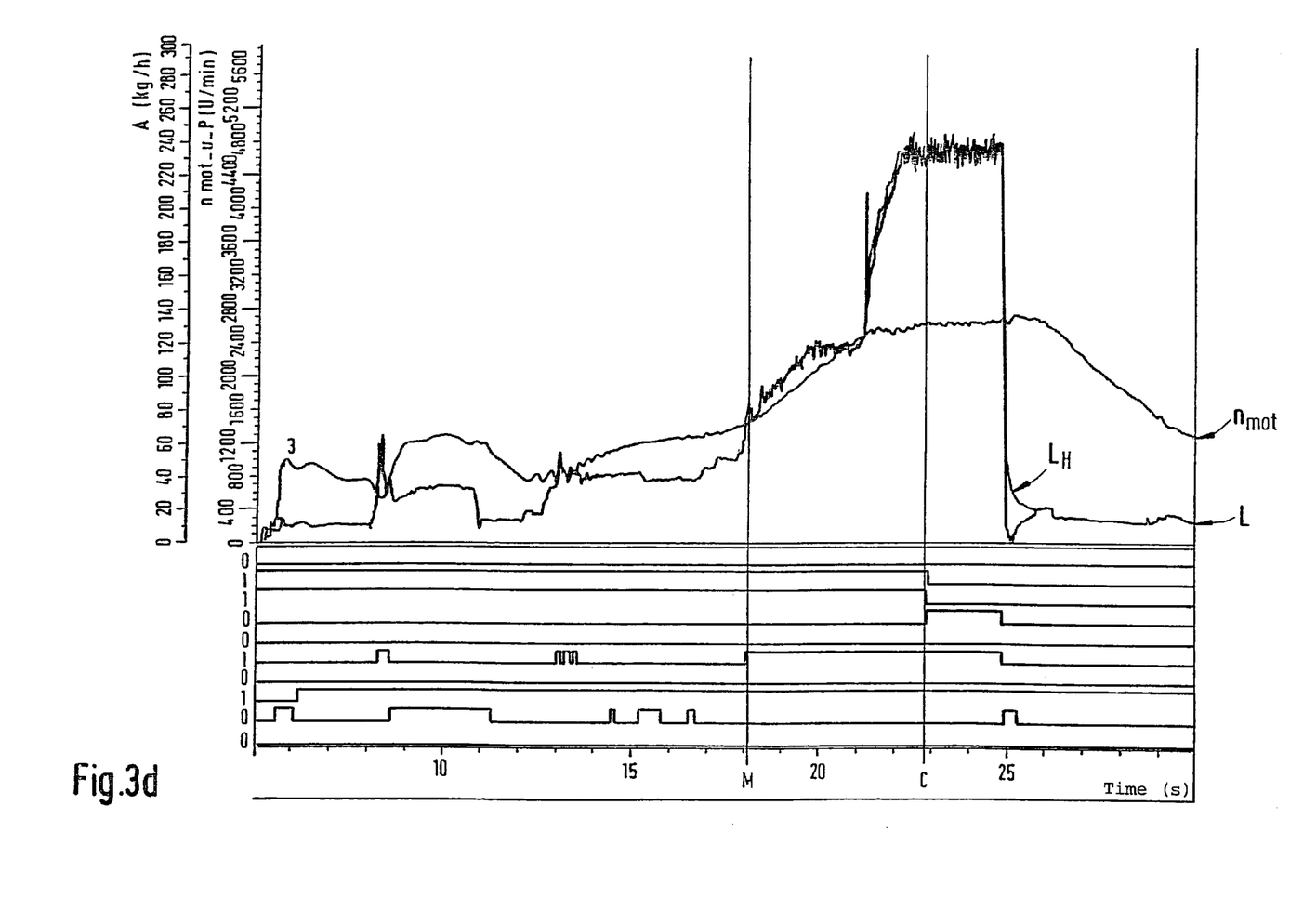

In FIG. 3d, an engine is started without a leak and a leak is detected and repaired during the course of operation. After detecting that the leak is no longer present, the signal for the presence of leak 8 in the intake manifold 2 is set back so that there can again be a switchover from emergency operation to normal operation.

It is understood that the foregoing description is that of the preferred embodiments of the invention and that various changes and modifications may be made thereto without departing from the spirit and scope of the invention as defined in the appended claims.

What is claimed is:

1. A method for controlling the metering of fuel of an injection system of an internal combustion engine having an intake manifold including an engine having an exhaust-gas turbocharger, the method comprising the steps of:
   determining the inducted air mass (L) in said intake manifold of said engine as a primary control quantity utilizing an air mass measuring apparatus;
   computing a cylinder charge with a control apparatus;
   providing a substitute signal (P) as said primary control quantity from data stored during non-fault operation of said engine;
   detecting a leak occurring in said intake manifold from a changed pressure ratio; and,
   switching over to said substitute signal (P) when said leak is detected and utilizing said substitute signal (P) as the primary control quantity for metering said fuel thereby ensuring a continued operation of said engine.

2. A method for controlling the metering of fuel of an injection system of an internal combustion engine having an intake manifold including an engine having an exhaust-gas turbocharger, the method comprising the steps of:
   determining the inducted air mass (L) in said intake manifold of said engine as a primary control quantity utilizing an air mass measuring apparatus;
   computing a cylinder charge with a control apparatus;
   providing a substitute signal (P) as said primary control quantity;
   detecting a leak occurring in said intake manifold from a changed pressure ratio;
   switching over to said substitute signal (P) when said leak is detected; and,
   switching over to said substitute signal (F) after the elapse of a preset delay time after the detection of said leak.

3. The method of claim 2, comprising the further step of computing said substitute signal (P) from the angular position (a) of the throttle flap and the instantaneous engine rpm (n).

4. The method of claim 2, comprising the further step of utilizing a stored characteristic field with real pressure ratios in said intake manifold to detect said leak.

5. A control arrangement for computing a cylinder charge of an internal combustion engine having an intake manifold including an engine having a turbocharger, the control arrangement comprising:
   an air mass measuring apparatus for determining the inducted air mass flow in the intake manifold as a primary control quantity;
   a control apparatus for computing said cylinder charge utilizing said inducted air mass flow;
   said control apparatus including a characteristic field stored therein with a real pressure ratio in said intake manifold as a function of engine rpm (n) and a throttle flap angle (a) with said characteristic field being stored during non-fault operation;
   means for computing a substitute signal (P) as said primary control quantity from said characteristic field when a leak occurs in said intake manifold; and,
   means for switching over to said substitute signal (2) as a primary control quantity when said leak is detected thereby ensuring a continued operation of said engine.

6. A control arrangement for computing a cylinder charge of an internal combustion engine having an intake manifold including an engine having a turbocharger, the control arrangement comprising:
   an air mass measuring apparatus for determining the inducted air mass flow in the intake manifold as a primary control quantity;
   a control apparatus for computing said cylinder charge utilizing said inducted air mass flow;
   said control apparatus including a characteristic field stored therein with a real pressure ratio in said intake manifold as a function of engine rpm (n) and a throttle flap angle (a);
   means for computing a substitute signal (P) as said primary control quantity when a leak occurs in said intake manifold;
   means for switching over to said substitute signal (P) when said leak is detected; and,
   the pressure ratio of an intake manifold pressure to a charging pressure of said exhaust-gas turbocharger being stored in said characteristic field.

7. A control arrangement for computing a cylinder charge of an internal combustion engine having an intake manifold including an engine having a turbocharger, the control arrangement comprising:
   an air mass measuring apparatus for determining the inducted air mass flow in the intake manifold as a primary control quantity;
   a control apparatus for computing said cylinder charge utilizing said inducted air mass flow;
   said control apparatus including a characteristic field stored therein with a real pressure ratio in said intake manifold as a function of engine rpm (n) and a throttle flap angle (a);
   means for computing a substitute signal (P) as said primary control quantity when a leak occurs in said intake manifold;
   means for switching over to said substitute signal CP) when said leak is detected; and,
   said switching means being a delay switch for a time-delayed switchover to said substitute signal (P).

* * * * *

UNITED STATES PATENT AND TRADEMARK OFFICE
CERTIFICATE OF CORRECTION

PATENT NO. : 6,644,284 B2
DATED : November 11, 2003
INVENTOR(S) : Manfred Pfitz

It is certified that error appears in the above-identified patent and that said Letters Patent is hereby corrected as shown below:

Title page,
Item [73], Assignee, delete "Gmbh" and insert -- GmbH -- therefor.

Column 5,
Line 58, delete "(F)" and insert -- (P) -- therefor.

Column 6,
Line 19, delete "(2)" and insert -- (P) -- therefor.
Line 61, delete "CP)" and insert -- (P) -- therefor.

Signed and Sealed this

Sixth Day of April, 2004

JON W. DUDAS
*Acting Director of the United States Patent and Trademark Office*